July 25, 1967

R. D. LINVILLE 3,332,578

METHOD AND APPARATUS FOR MIXING AND BLENDING

Filed April 11, 1966

INVENTOR
RICHARD D. LINVILLE

BY

Fidler, Bradley & Patnaude

ATTORNEY

INVENTOR
RICHARD D. LINVILLE

July 25, 1967 R. D. LINVILLE 3,332,578
METHOD AND APPARATUS FOR MIXING AND BLENDING
Filed April 11, 1966 4 Sheets-Sheet 3
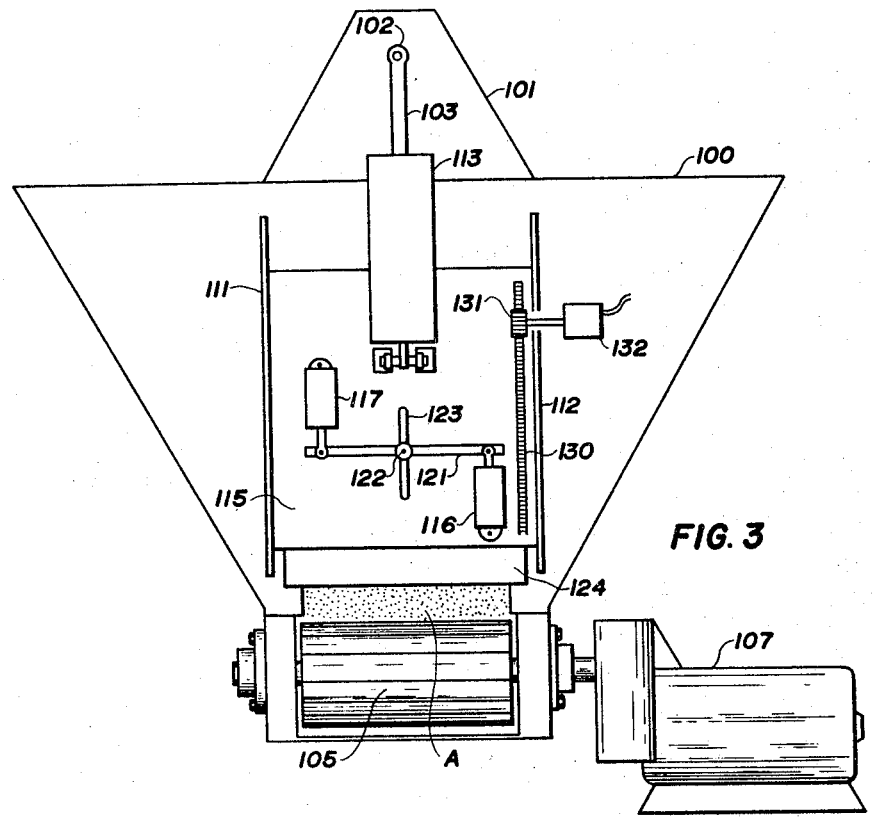
FIG. 3
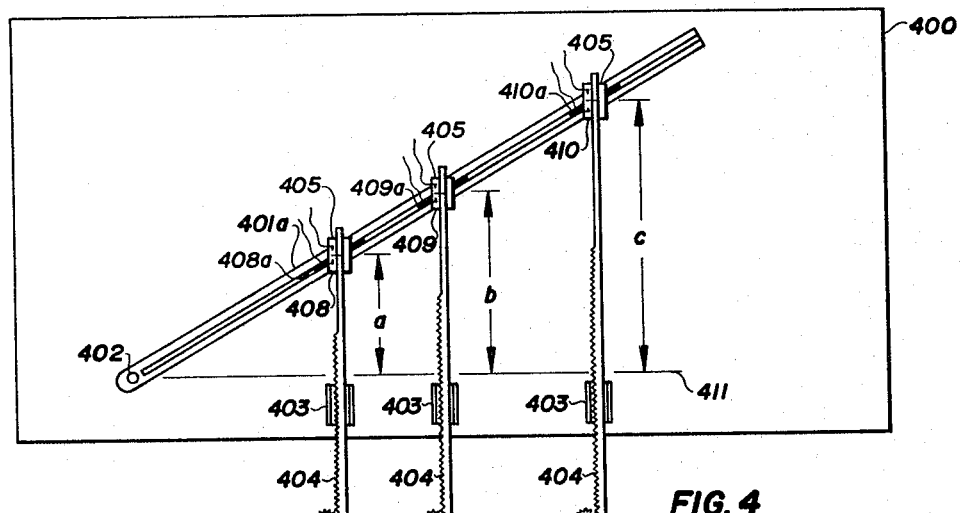
FIG. 4
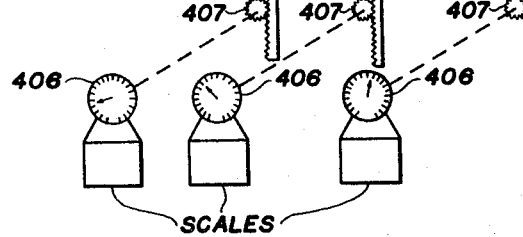
INVENTOR
RICHARD D. LINVILLE
BY
*Fidler, Bradley & Patnaude*
ATTORNEY INVENTOR
RICHARD D. LINVILLE
BY
Fidler, Bradley & Patnaude
ATTORNEY

United States Patent Office 3,332,578
Patented July 25, 1967

3,332,578
METHOD AND APPARATUS FOR MIXING AND BLENDING
Richard D. Linville, Box 444, Pleasant Valley, Iowa 52767
Filed Apr. 11, 1966, Ser. No. 541,785
11 Claims. (Cl. 222—57)

This application is a continuation-in-part of an application Ser. No. 368,818, filed on May 20, 1964, by the same applicant, said application having matured into Patent No. 3,245,584, of Apr. 12, 1966.

This invention generally relates to a method and apparatus for controlling the rate of change of one or more values to maintain said values in a predetermined proportion with respect to one another and/or with respect to an uncontrolled variable. While the invention finds particular application at the present time for controlling the rates of flow of ingredients in a mixing process and is described herein in connection with such an embodiment, it is equally suited for maintaining the values of other controlled variables in a desired functional relationship. For example, the controlled variable may be temperature, pressure, and volume or weight in a chemical process; they may be numbers in a calculating system; and they may be velocity, acceleration, direction and distance in a guidance control system. Other such uses for the present invention will be readity apparent to those skilled in the art.

In the above-identified application certain aspects of the present invention are disclosed in connection with a batch-blending and mixing system and the claims in that application are directed to a system which finds particular application in the mixing and blending of batch quantities of materials such as fertilizers. This application, on the other hand, discloses several modifications of the system disclosed in the above-identified application so that the system may be best used for other purposes. These modifications also render the system more easily operated by relatively unskilled personnel to insure a faster and more accurate control of the related variables.

Inasmuch as the major portion of one of the systems disclosed in this present application may be the same as the corresponding portions of the system disclosed in the above-identified application, reference is directed to that application for a description of those particular circuits and ther operation.

In the prior control art, control of a plurality of conditions in a process is carried out by separate control systems in which the level of each condition or value to be controlled is preset individually and controlled individually by feed-back information and correction means of various sorts. These prior art systems employ no integrated control means which affords direct cross-control in the feedback information. Various feeding means are sometimes driven by a common power unit with various ratios applied from this unit to the driver of each separate control element, but any feed-back information only controls the operation of a single element and does not cross-control the combined relationships of the various feed-back information. Also, a disadvantage of the prior art control systems is the fact that the relationships between the various values or conditions to be controlled are relatively difficult and time-consuming to set up and often require test runs to determine if the desired feed rates have actually been accomplished.

In one instance in the prior control art, Patent 3,042,-258 to Mayes discloses a system in which the relative rate of flow of two fluids is controlled by means of a ratio setting lever having a movable fulcrum. Feed-back is accomplished by means of pulses. Accordingly, the control is not continuous, and more importantly, it has no retroactive correction. When a substantial error occurs, as, for example, when the system temporarily loses control, the only recourse is to shut down the system and make the required corrections. A further disadvantage of this type of prior art controller is that a separate control system is required for each pair of fluids to be controlled thus appreciably increasing the overall cost. A still further disadvantage of this type of system is that due to wear on the parts, the inherent backlash in the gearing system and the probability of the operator making calculating errors, the results are not reliable.

Another feature of the present invention is that the control system itself can be used to automatically calculate the required quantities of each material in a batch-blending process so that the operator need not make any calculations before setting up the equipment for a particular blending operation.

Therefore, a principal object of the present invention is to provide a new and improved method for controlling variables to maintain the values thereof in a desired proportion.

Another object of this invention is to provide new and improved control means for carrying out said method.

Still another object of this invention is to provide a new and improved control circuit for maintaining one or more variables in a desired functional relationship.

A further object of this invention is to provide a new and improved system for facilitating the setting up of process control equipment.

A still further object of this invention is to provide new and improved means for calculating a plurality of values in response to another plurality of values.

Further objects and advantages and a better understanding of the present invention may be had by reference to the following detailed description taken in connection with the accompanying drawings, in which:

FIGURES 1 and 2 comprise an electric circuit diagram of a control system embodying the present invention;

FIGURE 3 is a front elevational view of a hopper and gate assembly usable in equipment embodying the present invention;

FIGURE 4 is another embodiment of the present invention wherein a mechanical linkage is used in controlling the relative values of the controlled quantities.

Figure 1:
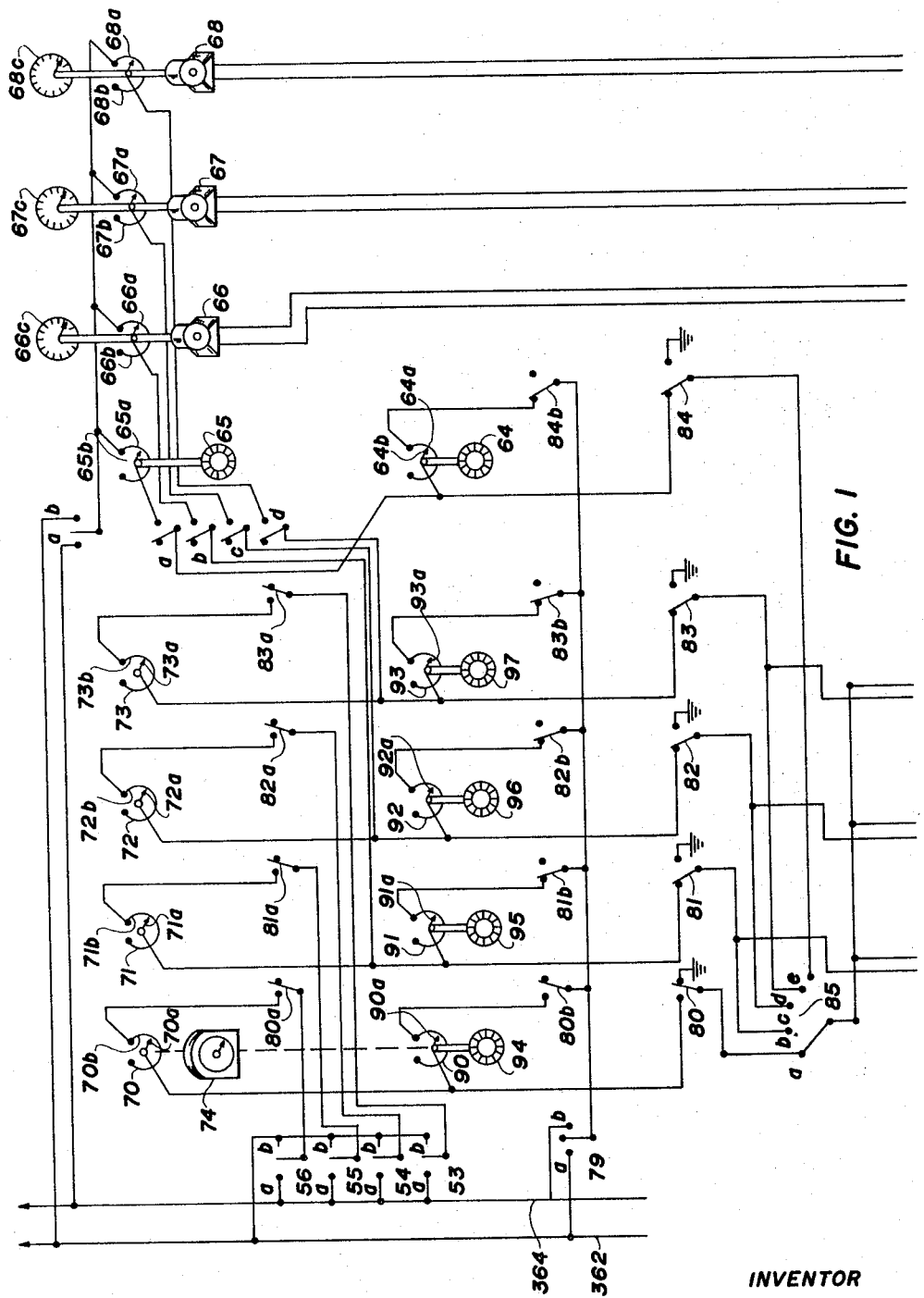
Figure 2:
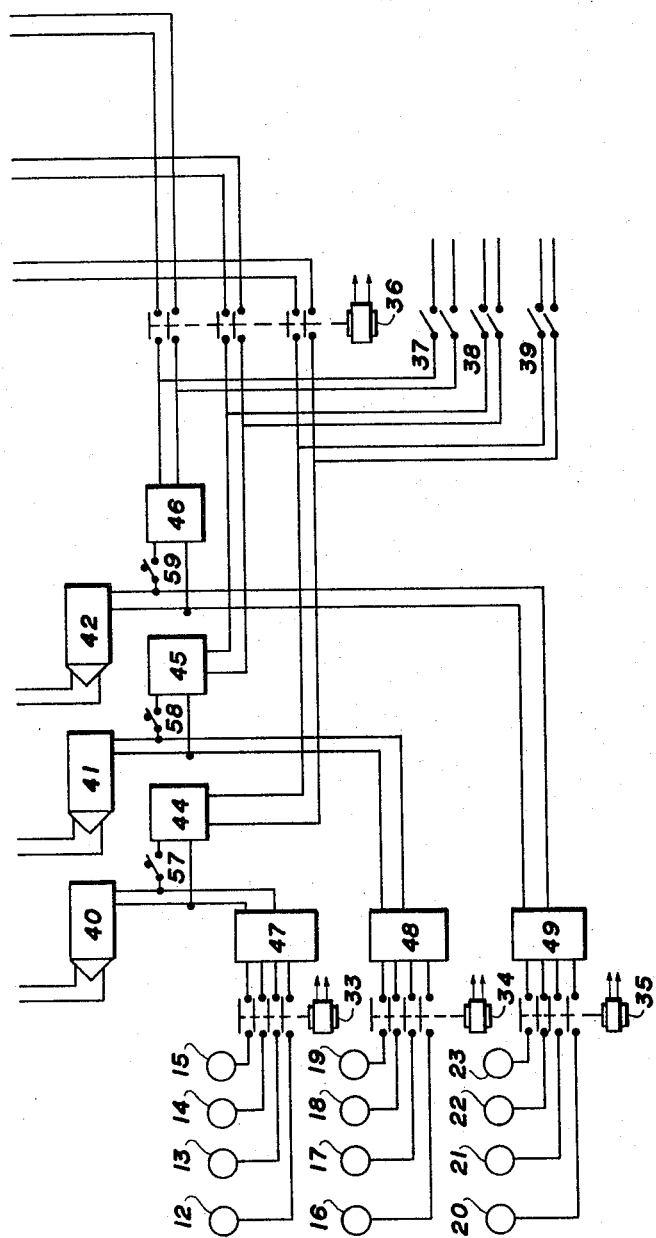

Referring to the schematic electric circuit shown in FIGS. 1 and 2, a source of alternating current power is adapted to be connected across a pair of bus conductors 362 and 364 from which this entire control circuit is energized. This circuit may be used for controlling one, two, or three variables in relation to a fourth variable and includes four control rheostats 70, 71, 72, and 73. These rheostats are respectively provided with wiper elements 70a, 71a, 72a and 73a and associated resistance windings 70b, 71b, 72b and 73b. While the wipers 70a–73a may be positioned by any suitable means in response to a value being controlled, in a mixing process as here described the wiper 71a may be controlled by the weight of one ingredient in a batch-blending process; the wiper 72a may be controlled by the weight of another ingredient in the process; and the wiper 73a may be controlled by the flow rate of another ingredient. In this system, the wiper 70a is positioned by a clock mechanism or timer 74 which can be used to rotate the wiper 70a over the rheostat winding 70b from a preset setting of so many hours, minutes, to zero as the period of time elapses or it could drive the wiper 70a until a predetermined time has expired. The actual resistance of the rheostat element 70b as well as that of the elements 71b, 72b and 73b can be of any desired value selected for its practicability in connection with the other elements of the circuit and for most purposes such windings or elements will have a linear taper. However, if a change of rate with the passage of time is desired, then a taper equivalent to a mathematical progression or a power may be selected to produce the desired acceleration, deceleration and the like.

A second set of rheostats 90, 91, 92, and 93 are provided having respective wipers 90a, 91a, 92a and 93a and associated resistance elements. The wipers 91a, 92a and 93a are directly connected to the wipers 71a, 72a and 73a, respectively. A plurality of control knobs 94, 95, 96 and 97 are provided for setting the positions of the wipers 90a, 91a, 92a and 93a to the desired proportion or relation between the conditions or quantities to be controlled. When thus set, the proportion will be represented by the readings of these knobs and their associated scales. Preferably, the clock 74 is also connected to the control knob 94 so that when the wiper 90a is set to the desired position the clock 74 is simultaneously set to the same relative position. For many applications, it is also desirable to connect the wiper 70a to the control knob 94 during this initial setting but during the mixing operation it is necessary that the wiper 90a not follow the wiper 70a which is controlled by the clock; rather the wiper 90a must remain at all times in the initially set position.

A pair of ratio setting control knobs 64 and 65 respectively set a pair of wipers 64a and 65a relative to their associated resistance elements 64b and 65b. As is explained hereafter, these control knobs 64 and 65 and the associated rheostats are used in the calculation of the absolute values of the quantities to be provided in the final mix.

An additional set of rheostats respectively comprising wipers 66a, 67a and 68a and associated resistance windings 66b, 67b, and 68b are provided. A plurality of dials 66c, 67c, and 68c cooperate with associated pointers connected to the wipers 66a, 67a and 68a to give a visual indication of the respective positions of the wipers 66a, 67a and 68a relative to the associated resistance elements 66b, 67b and 68b. These wipers are respectively positioned by means of a set of servo-motors 66, 67 and 68 which are respectively controlled by a set of servo-motor control units 44, 45 and 46. While several different types of servo-motor control units are known in the prior art, the circuit illustrated in FIG. 3 of the above-identified application and described in detail in the specification thereof may be used for controlling the motors 66, 67 and 68.

In order to facilitate an understanding of the operation of the circuit of FIGS. 1 and 2, assume that it is desired to make up a mixture consisting of seventeen units of material A, ten units of material B, and fifteen units of material C. The materials A, B, and C may be all granular, all liquid, all gas, or any combination thereof. The system is set up for controlling the feeding of these ingredients in this desired proportion in the following manner. Assuming that wiper 71a is positioned in response to the weight of material A which has or has not been fed to a mixing station, control knob 95 is set to 17. This sets the wiper 91a to a corresponding position on the associated resistance element or winding 91. Assuming that wiper 72a is positioned in response to the amount of material B which has or has not been fed to the mixing station, control knob 96 is set to 10. Assuming that wiper 73a is positioned in response to the amount of material C which has or has not been fed to the mixing station, control knob 97 is set to 15. The total number of parts of each of the materials A, B, and C will thus give a basic quantity which depending upon the materials might be expressed in terms of pounds, pints or some other value.

Assume further, for example, that it is desired to process twenty-five basic quantities in this proportion. The control knob 65 is set to a value twenty-five times the setting of control knob 64. Accordingly, control knob 64 might be set to position 1 and the control knob 65 to position 25. Switches 81, 82, 83 and 84, which are connected between respective contacts b, c, d and e of selector switch 85 and the wipers 91a, 92a, 93a and 64a, respectively, are placed in the energized position as shown in the drawing. Switch 79 whose contacts a and b are respectively connected to the power busses 362 and 364 is placed in the a position thus connecting the windings 91a, 92a, 93a and 94a to the power line 362 through the switches 81b, 82b, 83b, and 84b, which are in the position illustrated in the drawing. Switches 51a, 51b, 51c and 51d, which are respectively connected between the wipers 65a, 66a, 67a and 68a and the wipers 64a, 91a, 92a and 93a are placed in the closed position and the common contact of the switch 52 is moved to the a position thus connecting the resistance windings 65a, 65b, 67b and 68b to the power bus 364. The wiper of the selector switch 85 is moved to the e position to connect the interconnected wipers 64a and 65a to a common terminal of each of a plurality of phase shift amplifiers 40, 41 and 42. The amplifiers 40, 41 and 42 are identical and may be of the type shown in FIG. 7 of the above-identified application and described in the specification thereof. These amplifiers provide an output signal between two output terminals which is of one phase when the input to the amplifier from the switches 81, 82 and 83 is of one polarity and is of the opposite phase when the signals are of the opposite polarity. The amplitude of the output signal from the amplifiers 40, 41 and 42 is dependent on the magnitude of the voltage across the input terminals thereto.

The switches 57, 58 and 59 are closed to connect the outputs from the amplifiers 40, 41 and 42 to the inputs of the servo-motor controllers 44, 45 and 46 and the relay 36 is energized to connect the outputs from these controllers 44, 45 and 46 to the servo-motors 66, 67 and 68.

Assuming that the wipers 66a, 67a and 68a are at the zero position from the preceding control cycle, they each have a voltage equal to that of the bus 364. Since the wipers 64a and 65a were initially set in a position other than zero, their voltages are, therefore, closer to that of bus line 362. With the switches in the above-described positions, the wiper 66a is connected to the wiper 91a and a voltage will thus appear between the input terminals to the amplifier 40 until the wiper 66a has been driven by the servo-motor 66 to a position wherein the ratio of the resistance between the upper end of the winding 66b and the wiper 66a and the resistance between the upper end of the winding of rheostat 91 and the wiper 91a is equal to the ratio of the resistance set on the rheostat 65b to that set on the rheostat 64b. Until this condition occurs, there is an output from the amplifier 40 which operates through the motor control until 44 to energize the servo-motor 66 to drive the wiper 66a toward the position where this condition occurs. Since the knobs 64 and 65 were set with a ratio of 25 to 1, the resistance set by the servo-motor 66 will be twenty-five times that set by the control knob 95. In like manner, the servo-motors 67 and 68 will be energized until the associated wipers 67a and 68a occupy the same relative positions to the settings by the control knobs 96 and 97. The dials 66c, 67c and 68c now register the total amount or the absolute value of each of the respective elements to be controllably fed to the mixing station by this system.

The rheostats 66b, 67b and 68b which may be incorporated in commercially available automatic loading equipment such as may now be used for automatically loading hoppers or tanks with the required amounts of the respective materials.

When the associated hoppers or tanks are thus filled with the determined amount of the respective materials, the mixing and feeding operation may be initiated by opening the switches 51a and 84b to disconnect the ratio control rheostats from the system. Switches 81b, 82b and 83b are opened and switches 80b, 80a, 81a, 82a and 83a are closed. These switches now connect the rheostats 70, 71, 72 and 73 into the system and disconnect the rheostats 91, 92 and 93 from the system. Switch 80 is moved to the left-hand or closed position to connect the wipers 70a and 90a to the terminal a of the selector switch 85. If all of the materials A, B, and C are granular and are to be fed from a hopper having an adjustable gate, then the relays 33, 34 and 35 should each be energized thereby to connect a plurality of control elements such as solenoids 12, 13, 14 and 15 through a control panel 47 to the output of amplifier 40; solenoids 16, 17, 18 and 19 through a control panel 48 to the output of amplifier 41; and solenoids 20, 21, 22 and 23 through a control panel 49 to the output of amplifier 42. Also the switches 57, 58 and 59 are opened and relay 36 is de-energized to disconnect servo-motors 66, 67, and 68 from the system. The solenoids 12 and 13; 16 and 17; and 20 and 21 are operated by the conventional relay circuits in control panels 47, 48 and 49 which react only to signals from the amplifiers 40, 41 and 42 which exceed a predetermined value. The solenoids 14 and 15, 18 and 19 and 22 and 23, however, are operated by conventional relay circuits in control panels 47, 48 and 49 which react to the signals from the amplifiers 40, 41 and 42 which are less than said predetermined values.

If, on the other hand, material B, for example, were a fluid whose rate of flow would be controlled by the degree to which a valve is opened, switch 58 would be left closed and the relay 34 would be left de-energized. The control circuit 45 would thus remain connected to the output of the amplifier 41 and by closing the switch 38 the output from the control circuit 45 would be connected to a suitable fluid control means such as a servo-motor operated control valve of a type commercially available, such for example, as sold by Vickers, of St. Louis, Mo.

In order to facilitate an understanding of the manner in which the signals from the amplifiers 40, 41 and 42 may be used to control the feeding of granular material to a mixing or processing station, reference is directed to FIG. 3 wherein is illustrated the delivery end of a hopper 100 having a feed control gate assembly. The hopper 100 has a generally trapezoidal feeding portion having a rigid, upwardly extending plate 101 to which an arm 103 of a hydraulic or pneumatic cylinder 113 is rigidly connected by a pin 102. It will be understood that the rod 103 is connected to the piston of the cylinder 113. The cylinder body is suitably connected to a rectangular gate member 115 which is slidably mounted for vertical movement by a pair of guides 111 and 112. The gate member 115 can thus be raised or lowered by applying fluid pressure to one end or the other of the cylinder 113 by remotely operated controlled valves of a commercially available four-way construction well known in the art.

In order to sense the position of the gate member 115 and provide a signal indicative of such position there is provided a gear rack 130 which is attached to the face of the gate 115. The rack 130 is adapted to drive a pinion 101 which is connected through a reduction gear assembly to the wiper of a rheostat 132. Hence, the position of the gate assembly 115 can be remotely determined from the voltage appearing across the output terminals of the rheostat 132.

Since the gate member 115 must be relatively massive for many applications, small or minor changes in the feed rate are achieved by a secondary gate member 124 which is slidably mounted on the gate member 115. Considered in greater detail, a pin 122 is fixedly attached to the gate 124 and extends through a vertically disposed slot 123 in the face in the face of the gate member 115. The pin 122 also extends through a suitable aperture in a crossbar member 121 and is secured thereto. To the respective ends of the member 121 there are connected the pistons of a pair of hydraulic or pneumatic cylinders 116 and 117. The other ends of these cylinders 116 and 117 are fixedly attached to the gate member 115.

A drag conveyor including a belt or the like 105 is mounted directly beneath the hopper 100 and supports the material A therein. The drag conveyor 105 is driven at a constant speed by a gear motor 107. As the conveyor 105 is thus driven from back to front as shown in FIG. 3, it drags material A through the gate opening and drops it into a suitable conveyor such as a feed screw (not shown). It may thus be seen that the greater the gate opening the greater will be the flow rate of material A.

Referring again to FIG. 2, the solenoids 12 and 13 respectively control valves (not shown) connected to opposite sides of the cylinder 113 so that when the solenoid 12 is energized and the solenoid 13 is not energized, the gate members 115 and 125 will move downwardly. When the solenoid 13 is energized, the solenoid 12 is not energized, and the gate will move upwardly. In like manner, the solenoid 14 operates a valve controlling the cylinder 116 and the solenoid 15 is connected to a control valve for the cylinder 117. Therefore, when solenoid 14 is energized, cylinder 116 is extended to open the gate 124 a litle further than it would be in a neutral position. The valves 14 and 15 are of the three-way type so that when they are not energized, cylinders 116 and 117 are retracted. Similarly, when solenoid 15 is energized it operates cylinder 117 which when it extends closes gate 124 a little further than it would be at a neutral position. Accordingly, small error signals from the amplifier 40 will operate one or the other of these cylinders 116 and 117 to make quick minor corrections in the flow of the associated material, due, for example, to inconsistencies in flow for any reason. When the error is greater, the solenoids 12 or 13 will be energized to make the more substantial changes in the rate of flow.

Assuming that material B is a liquid and its rate of flow is controlled by a variable flow valve such, for example, as made by Vickers, St. Louis, Mo., a suitable servo-motor may be used to control such a valve and with the switches 58 and 38 closed the output from the amplifier 41 will control the position of the servo-motor connected to the output of the switch 38, thus controlling the position of the associated variable flow valve. Other means for utilizing the outputs from any of the amplifiers 40, 41 and 42 themselves or from the associated motor control circuits 44, 45 and 46 will be apparent to those skilled in the art.

To start the mixing operation, the clock motor 74 is now energized thereby to rotate the wiper 70a at a predetermined rate of speed in a counterclockwise direction toward the zero position until it contacts the upper end of the rheostat winding 70b. As the wiper 70a rotates, the ratio of the resistances of the rheostats 70 and 90 will change and the amplifiers 40, 41 and 42 will provide an output signal corresponding to this change. These output signals, however, in turn cause the materials A, B, and C to be fed at a rate to maintain the ratio of the resistances of rheostats 71 and 76b, 72 and 77b, and 73 and 78b in the initially set proportion. As long as the wiper 70a is not moved at a rate faster than the hoppers or feed control devices for the materials A, B and C can follow, the materials A, B and C will be fed at the desired proportion.

While this circuit has been described in connection with a blending or mixing operation, it will be readily understood by those skilled in the art that it has many other uses wherever variables are to be controlled in a related manner. For example, it may be used to control the movement of one object toward another. Let us assume that the object whose velocity is to be controlled is approaching the other object at a velocity of 500 miles per hour and is 40 miles distant therefrom. Assume further that it is desired to decelerate the controlled object at a uniform rate so that it reaches the relatively stationary object in six minutes and has a contact velocity of about zero.

Accordingly, the switches 55 and 66 are placed in the *a* position and the switches 80, 81, 80*a*, 81*a*, 80*b* and 81*b* are closed. Switch 79 is placed in the *b* position and the timer 74 is set by the control knob 94 to six minutes, the desired time of travel. The selector switch 85 is then placed in the *a* position putting the timer in control and the output of the amplifier 41 is connected to control a decelerating means in the moving object under control. Therefore, as the timer moves the wiper 70*a* toward the zero position the amplifier 41 will provide an output to decelerate the moving object so that its velocity is decelerated in proportion to time. Since it is desired to bring the objects together at a relative velocity of about zero, the rheostat winding 70*b* should have a resistance taper so that the resistance change decreases in the direction of the terminal 70*b*. Accordingly, by the time the movable object reaches the fixed object, its velocity has been reduced to almost zero and the objects contact when the timer 74 reaches zero. The position of the wiper 71*a* is controlled by suitable means so that its position continuously corresponds to the distance between the objects.

The basic principle on which the system of FIG. 2 operates can also be embodied in an electromechanical system as illustrated in FIG. 4. In this system there is provided a table 400 on which an arm 401 is pivotally attached by means of a pintle 402. The arm 401 has a longitudinally extending slot 401*a* which forms a guideway for a plurality of slides 408, 409 and 410. The slide members 408, 409 and 410 are fixedly connected to the upper ends of a plurality of racks 404 which are adapted to be driven up and down by respective ones of a plurality of pinions 407. The slide members are in turn pivotally connected to a plurality of contact blocks 408*a*, 409*a* and 410*a* which slide in the guideway 401*a*. The pinions 407 are in turn respectively driven by a plurality of weighing scales 406. The racks 404 thus occupy respective positions corresponding to the weight measured by the scales 406. It will be understood that where the value of some condition other than weight is to be controlled, sensing means other than scales will be used to position the racks 404. As noted, the slides 408, 409, and 410 are pivotally connected to the racks 404 and the racks are held in a vertical position by means of a plurality of guide blocks 403 which are adjustably secured to the table 400.

A plurality of switches 405 are respectively mounted on the slide members 408, 409 and 410. The contacts are sliding contacts that can completely pass over each other. Two contacts are mounted on each of the slide members 408, 409 and 410. The mating contact is mounted on the rack. In neutral position, the rack contact is between the two slide contacts. Hence, if the rack moves down in relation to the pivoting slide, a signal of one polarity will be produced across the terminals of the associated switch 405 and if the arm 401 moves down in relation to a particular rack, a signal of opposite polarity will be provided.

In initially setting up the controller of FIG. 4, the slide members 408, 409 and 410 and the guide blocks 403 are adjustably positioned such that the distances between the intersection of the racks 404 and the guideway 401*a* from a horizontal line 411 inscribed on the table have the same proportion as the desired proportion of the elements in the final mix. It will be noted that the line 411 extends through the axis on which the arm 401 pivots. The guide blocks 403 are then secured in this position to the table 400. One of the scales 406 is selected as the master control and its rack and associated pivoting slide are locked together with a pivot pin or other suitable means so that the master control scale and its rack will control the position of the arm 401. The contacts from the switches 405 associated with the other ingredients are connected to suitable feed control devices such, for example, as the control gate assembly shown in FIG. 3. As the material weighed out by the control scale is fed and the scale 406 registers a different amount, the pinion 407 is driven to move the associated rack 404 thereby pivoting the arm 401. This in turn causes the slide members 409 and 410 to move relative to the other racks and to provide an output error signal to their associated control means to begin feeding the associated materials at a rate to maintain the slides 409 and 410 in the same relative position relative to the slide 408 whereby the materials are fed in the same proportions as initially set on the table 401.

Figure 5:
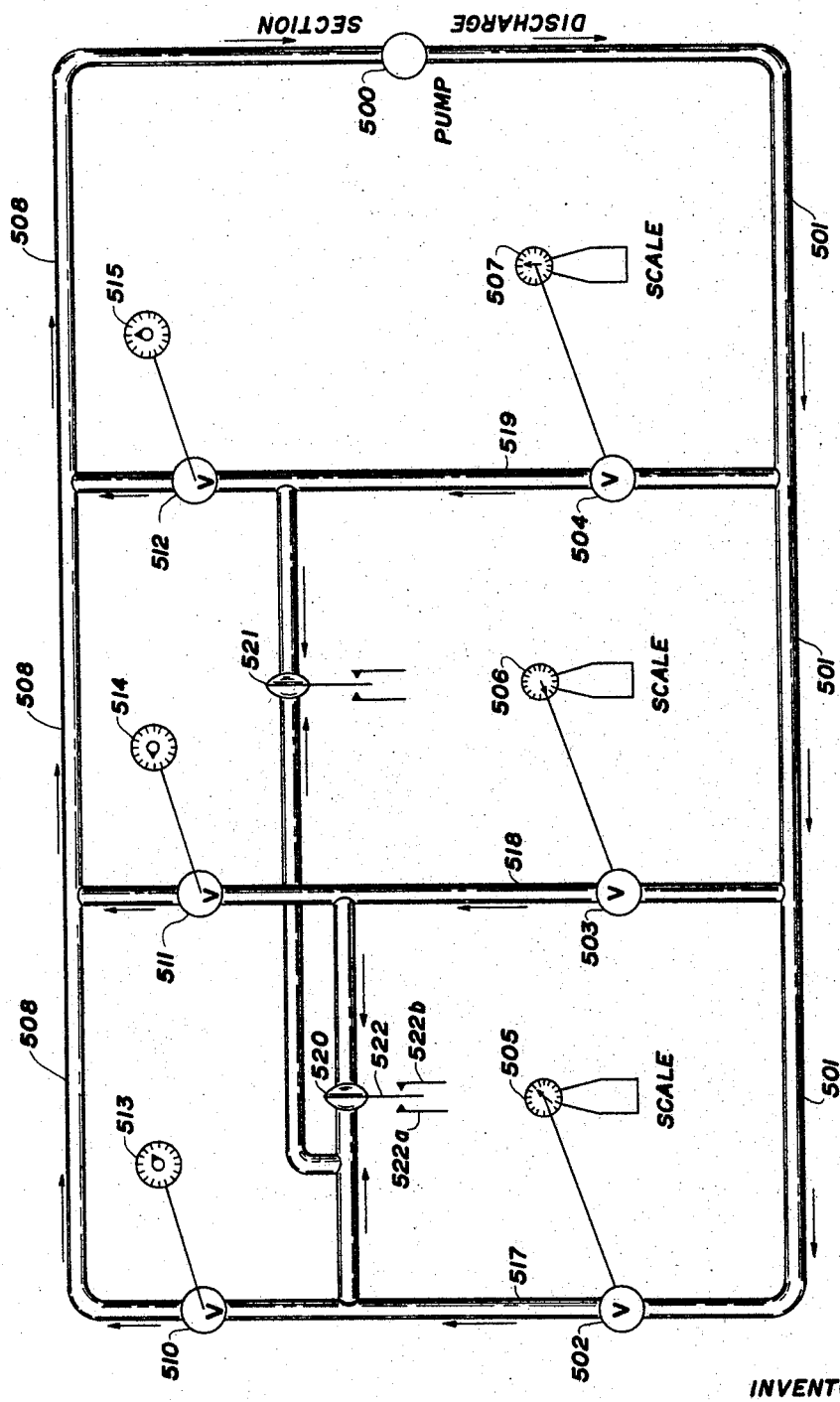
FIGURE 5 is a schematic diagram of a fluid control embodying the features of the present invention.

Referring to FIG. 5, there is shown a pneumatic or hydraulic control system also operating on the same basic principle as the electric circuit of FIGS. 1 and 2. In the circuit of FIG. 5 there is provided a pump 500 which pumps a fluid through a line 501 and thus to a plurality of valves 502, 503 and 504. The valve 502 may be controlled by a weighing scale 505 so as to have a degree of opening corresponding to the weight measured by the scale 505. In like manner, the valve 503 is controlled by a weighing scale 506 and the valve 504 is controlled by a weighing scale 507. The outputs from the valves 502, 503 and 504 are respectively connected by conduits 517, 518 and 519 to a plurality of control valves 510, 511 and 512 which are respectively set to an open condition by a plurality of knobs 513, 514, and 515. The outlets from the valves 510, 511 and 512 are connected via a line 508 to the return or suction side of the pump 500. It will be apparent that if the control knobs 513, 514 and 515 are initially set in accordance with the desired predetermined proportion and the valves 502, 503 and 504 are opened in accordance with the same proportion the pressures in the lines 517, 518 and 519 will be equal to one another.

In order to control the feed of material to or from the scales 505, 506 and 507 so that they do have this same relative proportion thereby maintaining the pressures in the lines 517, 518 and 519 equal, the line 517 is connected to one side of a diaphragm in a diaphragm controlled switch 522 and the line 518 is connected to the other side of the diaphragm 520. In a similar manner a diaphragm 521 is connected between the line 517 and the line 519. As shown, the diaphragm 520 is physically connected to a common contact element of the switch 522 so that when the diaphragm 520 is moved to the left due to the fact that the pressure in the line 518 is greater than the pressure in the line 517 the common contact will be connected to the contact 522*a* and when the diaphragm 520 moves to the right the common contact will be connected to the contact 522*b*. In like manner the diaphragm 521 controls the common contact member of the switch 523 relative to a pair of contacts 523*a* and 523*b*.

In operation, if the pressure in line 517 exceeds the pressure in line 518 the switch contact 522*b* will be closed and the resulting signal may be used to increase the flow rate of the ingredient measured by scale 506 thereby causing the weight measured by the scale 506 to increase and to open the valve 503 by a greater amount until the pressure in the line 518 equals the pressure in the line 517. The diaphragm control element 521 operates in the same manner to maintain the pressure in line 518 equal to the pressure in line 517 by controlling the rate at which the ingredient is fed to or from the scale 507. Hence, the flow rates are maintained in the same proportions set up by the control knobs 513, 514 and 515.

Digital buttons, stepping relays for inserting measured units of resistance can be used instead of rheostats. This is merely a different physical application of the same principle to enable one to apply and obtain values digitally through punched cards, tape controls, etc.

While the present invention has been described in connection with several embodiments thereof, it will be understood by those skilled in the art that many changes and modifications may be made without departing from the true spirit and scope of the invention. Therefore, it is intended in the appended claims to cover all such changes and modifications as fall within the true spirit and scope of the present invention.

What is claimed is:

1. A process control system for maintaining a plurality of variables in a predetermined functional relationship, comprising
   means for deriving a first signal having a value related to one of said variables,
   means for deriving a second signal having a value related to another of said variables,
   means for establishing a third signal and a fourth signal related to one another in said predetermined relationship, and
   means responsive to the difference between the ratio of said first and second signals and the ratio of said third and fourth signals for controlling at least one of said first and second signals to maintain them in said predetermined relationship.

2. A system according to claim 1 wherein
   said one of said variables is time, and
   said means for deriving said first signal comprises a clock mechanism.

3. A control system comprising
   a first plurality of impedances each having an impedance element and a movable wiper,
   a second plurality of impedances each having an impedance element and a movable wiper,
   a third plurality of impedances each having an impedance element and a movable wiper,
   a fourth plurality of impedances each having an impedance element and a movable wiper,
   first means for electrically connecting each of said wipers of said first plurality with a respective one of said wipers of said second plurality,
   second means for electrically connecting each of said wipers of said third plurality with a respective one of said wipers of said fourth plurality,
   means for electrically energizing said first, second, third and fourth plurality of impedances, and
   means responsive to signals derived from across the movable wipers of one of said pluralities for providing a control signal.

4. A system according to claim 1 further comprising
   first settable means for setting up a basic value,
   second settable means for setting a multiplier value, and
   said means for establishing said fourth signal is responsive to the product of said first and second settable means.

5. A system according to claim 4 wherein
   said first settable means is a variable impedance (91),
   said second settable means is a variable impedance ratio (64, 65), and
   said means for establishing said fourth signal comprises means for setting an impedance value related to the set value of said variable impedance (91) in the impedance ratio set on said second settable means.

6. A control system for maintaining a plurality of variables in a predetermined functional relationship, comprising
   means for deriving a first signal having a value related to one of said variables,
   means for deriving a second signal having a value related to another of said variables,
   means for establishing a third signal and a fourth signal related to one another in said predetermined relationship,
   said last-named means including means for causing one of said third and fourth signals to vary in accordance with a predetermined mathematical progression, and
   means responsive to the difference between the ratio of said first and second signals and the ratio of said third and fourth signals for deriving a control signal.

7. Apparatus according to claim 6 wherein said means for causing one of said third and fourth signals to vary in accordance with a predetermined mathematical progression includes a motor and an impedance device driven thereby.

8. A hopper gate mechanism comprising
   guide means (111, 112),
   a first gate member (115) movably mounted in said guide means,
   first motive means (113) for driving said gate member relative to an opening in said hopper (100), and
   auxiliary gate member (124) slidably mounted on said first gate member and having a portion extending beyond one edge of said first gate member,
   second motive means (116, 117) for moving said auxiliary gate member relative to said first gate member to effect small changes in the size of the gate opening.

9. The invention according to claim 8 wherein said second motive means comprises
   a first motive means (116) for moving said auxiliary gate member toward a fully open position when energized and to a neutral position when de-energized, and
   a second motive means (117) for moving said auxiliary gate toward a fully closed position when energized and to said neutral position when de-energized.

10. The invention according to claim 1 wherein
    said first and second signals are fluid pressures in a pair of lines (517, 518),
    said means for deriving said first and second signals are fluid control valves (502, 503),
    said means for establishing the third and fourth signals are fluid control valves (510, 511), and
    said means responsive to the difference between the ratio of said first and second signals comprises a pressure differential responsive device connected between said lines.

11. The invention according to claim 1 wherein
    said means for deriving said first and second signals comprise a pair of gear driven racks,
    said means for establishing the third and fourth signals comprises a pivotally mounted arm, and
    said means responsive to the difference between the ratio of said first and second signals are relatively movable switch contacts respectively mounted on said racks and on said arm.

References Cited

UNITED STATES PATENTS

| 1,298,302 | 3/1919 | Davis | 177—16 |
| 2,666,171 | 1/1954 | Williams | 318—28 |
| 2,990,937 | 7/1961 | Goslin | 222—55 |
| 3,062,408 | 11/1962 | Boudan | 222—55 |
| 3,139,216 | 6/1964 | Mell | 222—55 |
| 3,240,995 | 3/1966 | Morris | 317—6 |

ROBERT B. REEVES, *Primary Examiner.*

HADD S. LANE, *Examiner.*